United States Patent [19]

DeMeo

[11] Patent Number: 5,630,028
[45] Date of Patent: May 13, 1997

[54] METHOD OF REPRESENTING GRAPHIC DATA USING TEXT

[75] Inventor: Vincent DeMeo, N. Valley Stream, N.Y.

[73] Assignee: Bowne & Co., Inc., New York, N.Y.

[21] Appl. No.: 653,794

[22] Filed: May 28, 1996

[51] Int. Cl.$^6$ ............................................. G06K 15/00
[52] U.S. Cl. ..................................... 395/110; 395/109
[58] Field of Search ................................. 395/110, 114, 395/115, 116, 117, 164, 165, 166, 109, 150, 151; 400/61, 62, 63, 67, 69, 70, 76; 345/141, 128, 135, 143, 144, 192–195

[56] References Cited

U.S. PATENT DOCUMENTS

| | | | |
|---|---|---|---|
| 4,346,377 | 8/1982 | Green | 345/128 |
| 4,675,830 | 6/1987 | Hawkins | 395/110 |
| 5,301,267 | 4/1994 | Hassett et al. . | |
| 5,313,564 | 5/1994 | Kafri et al. . | |
| 5,325,479 | 6/1994 | Kaasila | 395/151 |
| 5,404,436 | 4/1995 | Hamilton . | |
| 5,469,532 | 11/1995 | Gerlach et al. . | |
| 5,502,804 | 3/1996 | Butterfield et al. . | |
| 5,506,944 | 4/1996 | Gentile . | |

*Primary Examiner*—Arthur G. Evans
*Attorney, Agent, or Firm*—Amster, Rothstein & Ebenstein

[57] ABSTRACT

A method of printing graphic data on a print system having associated data memory, at least one processor and a printer mechanism, using a plurality of fonts comprised of n predefined text characters geometrically arranged in a predefined relationship relative to a common origin and stored in the data memory, the method using character data representing a desired chart configuration having a common origin to print the chart by the processor selecting the predefined characters in accordance with the character data and enabling the printer mechanism to print the selected characters in their predefined orientation relative to the common origin of the chart to enable high speed printing of such graphic data.

12 Claims, 11 Drawing Sheets

METHOD OF REPRESENTING GRAPHIC DATA USING TEXT

BACKGROUND

The present invention relates generally to a method of representing graphic data on an output device, and more particularly, to a method of generating a printed graph or chart using text characters to facilitate faster printing on non-scalable raster image printers.

It is well known in the art to print complex graphics using bit-mapping techniques. In such applications, a representation of an image to be printed is generated in a page description language (PDL) such as Postscript. The PDL defines commands which enable complete and precise control of bitmap images as well as the attributes of character fonts, including point size, orientation, shading, etc. Typically, such printers include a processor adapted for receiving the PDL instructions from a connected computer, where the printer then locally bitmaps a desired custom image on a printing medium. Although this method is capable of producing high quality graphics, it is not well suited to applications where large amounts of relatively simple graphical data are to be printed. For example, it is often necessary to print appreciable numbers of individually customized charts or the like in connection with investment reports. In such applications, the bit-mapping technique is time-consuming and inefficient, as it may be necessary to use anywhere from 10,000 to 15,000 characters to construct each image.

It is also well-known in the art to print text characters in various shapes and sizes in what is typically referred to as "text mode." Characters are grouped together as fonts having particular attributes such as point size, orientation, shading and the like. Fonts that are printable in text mode are classified as either "hard fonts" or "soft fonts." Hard fonts are comprised of predefined font data that is stored in the printer's associated data memory. The printer's associated data memory includes read only memory (ROM) or some type of printer cartridge or the like. Soft fonts are comprised of data that may be communicated to the printer's buffer memory such as a random access memory (RAM) or the like. The soft fonts are thus predefined in the input computer and are downloaded to the printer when the print job is requested. When a document is to be printed data defining the document ms communicated from the attached computer to the printer. This data defines which characters to print and where to print them on the page to be printed. The printer retrieves the definition of the character from its memory and directs a printing mechanism to print the characters in accordance with the character data received from the computer. Since the characters are predefined, it is not necessary to graphically generate each one when printing the document. Thus, printing in accordance with this process can proceed in a relatively expeditious manner. However, such process, although suited for the printing of textual material, is not appropriate for the presentation of graphic material.

Present high speed non-scalable printing machines, such as the XEROX model 4135, are widely used for printing documents containing text characters at very high rates, on the order of 135 pages per minute. This type of printer, however, is not suitable for representing large amounts of graphical material. It would therefore be desirable to provide a method for enabling graphic data to be generated on such high speed printers at a rapid rate on the order of that associated with printing textual material. In the case of investment reports, such as those relating to pension plans for large companies, it is desirable for each report to contain a customized graphical representation of an employee's investment portfolio, typically in a pie-chart or the like. When printing many copies of these reports even the simple graphical arrangement of a pie chart can require much more printing time than that required to print the textual portions of the document. Thus, it is not commercially feasible to print out high speed documents containing text and graphical materials on a non-scalable printing machine.

SUMMARY OF THE INVENTION

The present invention solves the problems in the prior art relating to rapidly printing relatively simple graphical data representations in large quantities. In this connection, the present invention teaches a method that utilizes text characters to represent graphic data in a manner that enables high speed printing of such data. In particular, the graphical data in the form of a pie-chart is represented by text characters that are predefined in the data memory associated with the printer or the connected computer like conventional text characters that represent textual material. Thereafter, it is possible to print documents containing such charts as rapidly as those containing only textual material.

In view of the foregoing, it is an object of the invention to provide a new method of representing graphic data on an output device with text-characters to provide for faster printing of such data.

It is another object of the present invention to provide a method of representing graphic data on an output device with text characters to enable printing such data on print machines having non-scalable fonts.

In accordance with the above-identified objects and additional objects that will become apparent hereinafter, the present invention provides, in an exemplary embodiment, a method of representing graphic data on an output device, such as a printer, using font sets comprising a plurality of fonts of n predefined text characters in memory to generate a chart having a common origin.

In accordance with a preferred embodiment of the invention, each font set includes three types of fonts of like point size. A first font type is comprised of a plurality of shaded area sector fonts, each shaded area sector font comprising a plurality of shaded area sector characters of a predefined size and shading density or shading style. Each shaded area sector character has a border defined by a first phantom radial of a predetermined length and a second phantom radial of a predetermined length joined at a vertex and diverging at an angle 360/n therebetween, and a phantom arc segment joining the first and second phantom radials opposite the vertex. Each shaded area sector character has a unique predefined angular position around the common origin relative to a phantom datum line passing through the common origin.

A second font type is an arc segment font, comprising a plurality of arc segment characters of like size. Each arc segment character comprises an arc segment having a unique predefined angular position around the common origin relative to the phantom datum line located a radial distance from the common origin equal to the length of the phantom radials associated with the first font type.

A third font type is a radial line segment font, including a plurality of radial line segment characters, each formed of a radial line segment extending from the common origin and having a unique predefined angular position around the common origin relative to the phantom datum line, where the length of such line segment is substantially equal to the length of the phantom radials.

In all embodiments, the computer connected to the printer executes an application and represents a desired chart configuration in character data. The chart may then be printed in several ways, depending upon the desired configuration thereof.

In a first chart configuration in accordance with the invention, the chart is comprised of a plurality of shaded area regions, where each shaded area region has a shading density or shading style which differs from any adjacent shaded area region. This chart may be represented three ways: (1) with shaded area sector characters only (first font type), (2) with shaded area sector characters (first font type) and arc segment characters (second font type); or (3) with shaded area sector characters (first font type), arc segment characters (second font type) and radial line segment characters (third font type).

In the first instance, in accordance with the character data representing the chart, the processor selects from the data memory the predefined shaded area sector characters from each font in the respective predefined angular positions around the common origin relative to the phantom datum to define each shaded area region, and enables the print mechanism to print those characters in their predefined positions. This chart does not have any "hard" borders; instead, the outer periphery of the chart is defined between the shaded area sector characters and the background print medium by the edge of the shading along the phantom arc segments joining the first and second phantom radials of each shaded area sector character. Similarly, because each area region of the chart is represented by characters having a different shading density or shading style from any adjacent area region, the border between such adjacent area regions is defined by the different appearance of the respective shading density or shading style of each area region.

In the second implementation in which a chart having a plurality of shaded area regions as described above may be represented, a hard outer border between the shaded area regions and the background color of the print medium along the phantom arc segments of the shaded area sector characters is added. In this regard, in accordance with character data representing the chart, the method further comprises the steps of the processor selecting from the data memory and enabling the printer mechanism to print a plurality of predefined arc segment characters from the second font type located a radial distance from the origin substantially equal to the length of the phantom radials in their predefined positions.

In the third instance in which a chart having a plurality of shaded area regions as described above may be represented, a hard border is formed between each shaded area region. In this regard, in accordance with the character data representing the chart, the method further comprises the steps of the processor selecting from the data memory and enabling the printer mechanism to print a plurality of radial line segment characters, each in a predefined angular position around the common origin relative to the phantom datum line that corresponds to the location of a phantom radial bordering the shaded area sector character at the radial edge of each shaded area region.

In another chart configuration represented in accordance with the invention, a chart having a plurality of area regions includes at least one area region containing no shading (i.e., a "white region"). The non-shaded area region is bordered and partially defined by two adjacent shaded area regions. A boundary for the non-shaded area region to define the outer edge of the chart in this area is represented by a plurality of arc segment characters from the second font type. Thus, at a minimum, a chart having a plurality of shaded area regions and one non-shaded area region, may be represented by printing a plurality of predefined shaded area sector characters from each font of the first type to define the shaded area regions, and printing a plurality of predefined arc segment characters located at a radial distance from the common origin equal to the length of the phantom radials in the predefined angular positions corresponding to the non-shaded area region of the chart. If desired, the entire outer edge of the chart may be defined by selecting all the arc segment characters from the second font type. Similarly, hard borders between adjacent shaded area regions and between shaded area regions and the at least one non-shaded area region, may be defined by selecting a plurality of radial line segment characters, each in a predefined angular position around the common origin relative to the phantom datum line that corresponds to the location of a phantom radial bordering the shaded area sector character at the radial edge of each shaded area region.

In any of the above-described chart configurations, each shaded area region may be printed with a unique color if the printer has multiple color printing capability. Thus, the shaded area sector characters from each font of the first font type may be printed with a different color to provide a chart having different shading densities or shading styles, and different colors in each area region. If the outer border is defined by a plurality of arc segment characters, such border can be printed in the same color as the associated shaded area sector characters. Similarly, a hard border between two adjacent shaded area regions can be represented in the color of either shaded area region or another color if desired. It is also possible to represent a plurality of shaded area regions of a chart with shaded area sector characters of like shading density or shading style, but with different colors. Thus, different shaded area regions can be defined with a single font by printing select shaded area sector characters from that font in different colors.

In another embodiment, a particular shaded area region or non-shaded area region may be emphasized by representing that area with characters from fonts having larger point sizes than those used to represent the rest of the graph. For example, if a particular shaded area region is enlarged to stand out from the remaining shaded area regions, that region is represented with at least one shaded area sector character of a font that is relatively larger than those used to represent the other shaded area regions. If the larger shaded area region is to be bounded by radial line segment characters and arc segment characters, such characters corresponding to the same predefined angular positions and point size as the shaded area sector characters are selected.

In yet another embodiment, a fourth font type comprises a single border character that may be used to represent a hard border around the periphery of shaded and non-shaded area regions of a chart. Where the hard border is to be configured in a single color and is continuous around the entire chart, the single border character may be used in lieu of the plurality of arc segment characters described in the foregoing. The single border character consists of circle having a center coincident with the common origin and a radius substantially equal to the lengths of the phantom radials of the shaded area sector characters in the same font set.

The many advantages of the present invention will become apparent as the detailed description of the invention proceeds with particular reference to the accompanying drawings below.

DETAILED DESCRIPTION OF THE PREFERRED EMBODIMENT

With reference to the several views of the drawings, the present invention teaches a method of representing graphic data using a plurality of text characters arranged in font sets.

Figure 1:
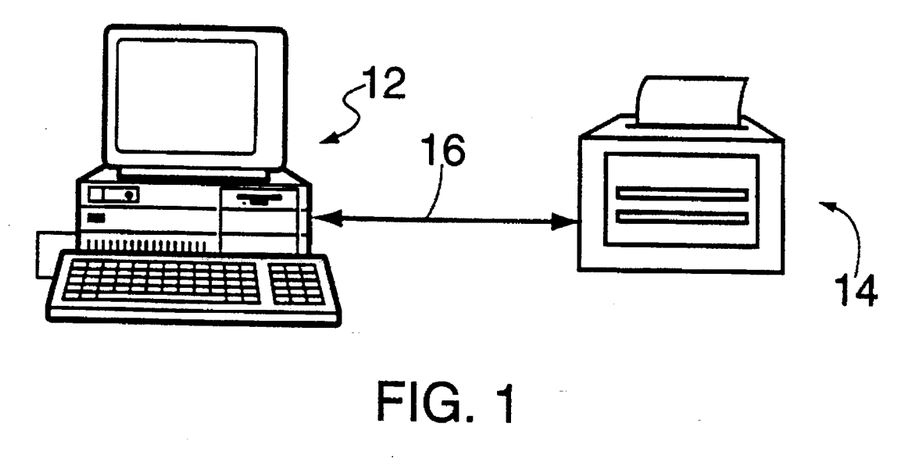
FIG. 1 is a schematic of a computer communicating with a printer.
Figure 2:
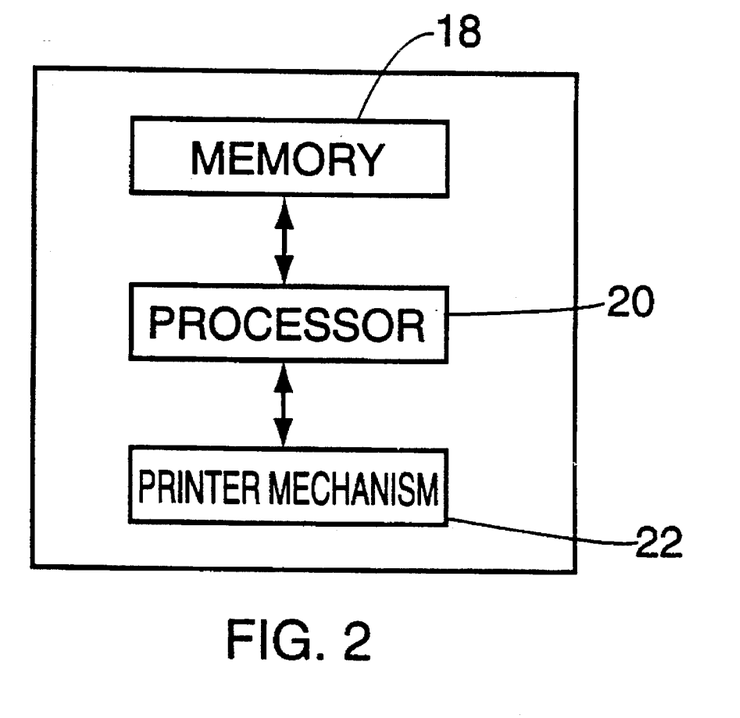
FIG. 2 is a general schematic of a printer.
Figure 3:
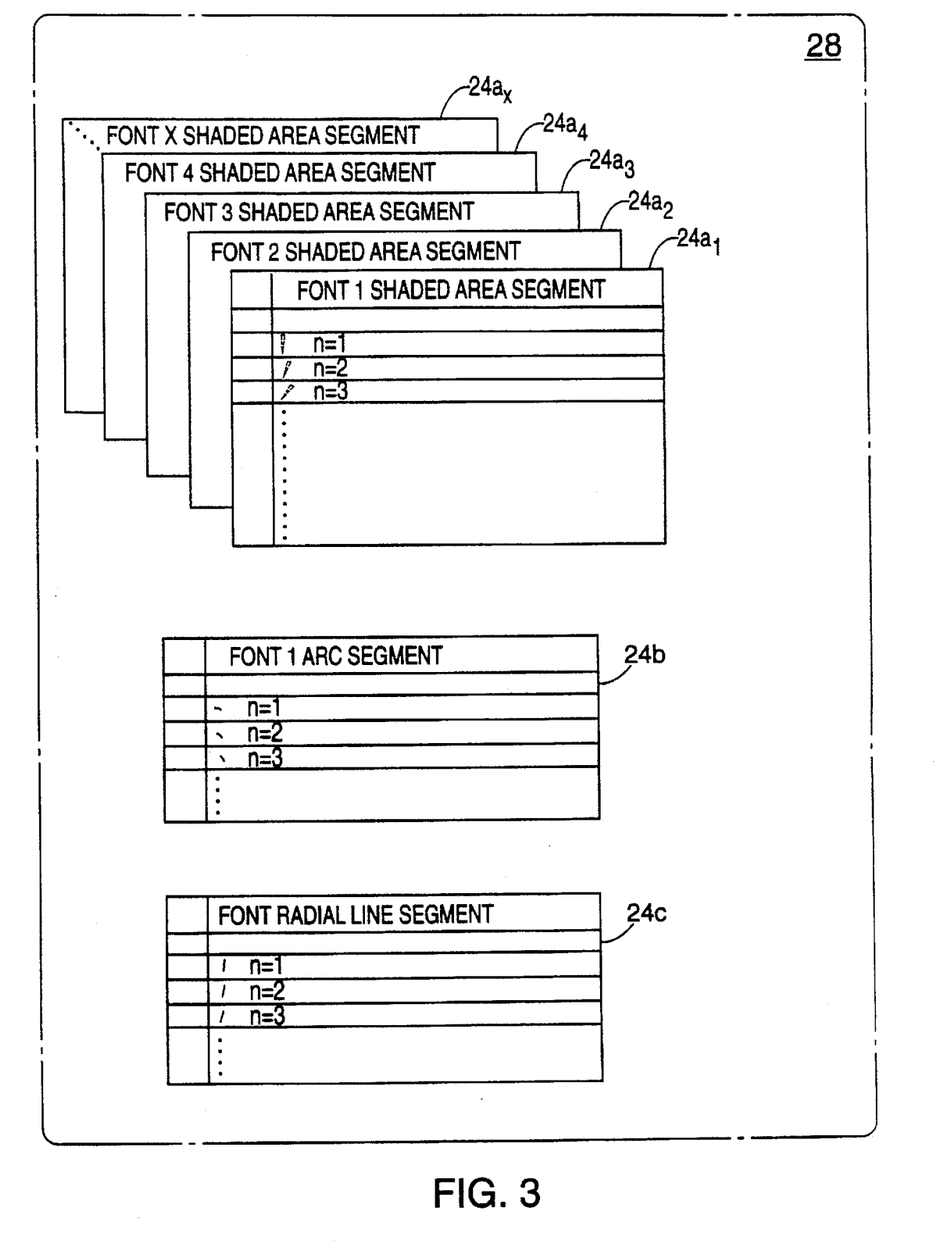
FIG. 3 is a printer memory arrangement of a font set in accordance with the present invention.

Referring now to FIG. 1, there is shown a schematic of a computer 12 communicating with a printer 14 via a standard communications cable 16. The printer 14 includes a printer data memory 18, central processing unit 20 and a printer mechanism generally denoted by the reference numeral 22 for printing on print media. Some printers may not have a central processing unit 20 (so called "dumb printers"), as all data processing is implemented at the computer 12. As these components and the operation of such printers are well known in the art, they need not be described here in detail. For the purpose of description, the data memory 18 includes a plurality of font tables 24 arranged in font sets 28. Each font set 28 is comprised of a plurality of fonts of a particular point size, and each font is comprised of a plurality of predefined text characters, which are typically stored as a bit-map. FIGS. 8–13 depict exemplary font tables with ASCII character code assignments for the characters in each font used to generate a sample chart 30 shown in FIG. 6 and described in more detail below. These font tables either permanently reside in ROM ("hard fonts") within the printer 14, or are communicated from the computer 12 ("soft fonts") to the printer 14 when required.

The graphic representation is generated by selecting the predefined text characters from each font and combining the same to provide the desired image. In the illustrative embodiment, the graphic representation is depicted as a circular graph, of the type commonly referred to as a pie-chart. This chart is comprised of a number of shaded regions, each representing a percentage of some whole quantity. For example, a chart of this type may represent the constituent investments in an investment portfolio, with a proportional breakdown of each type of investment (e.g., bonds, mutual funds, global funds, cash, stocks, etc.) depicted graphically as an area region. An investment portfolio comprised of, for example, 21% bonds, 13% mutual funds, 21% global funds, 8% cash, and 37% stocks, is graphically represented in the sample chart 30 shown in FIG. 6. The text characters that make up the chart 30 all have a common point of origin 32. In this particular example, the chart 30 has five (5) area regions, respectively identified as area regions #1, #2, #3, #4 and #5. Area regions #1–#4 each have a different shading style or shading density from any adjacent area region, and area region #5 is non-shaded, i.e., it has the white background of the print medium. The shaded area regions in the chart 30 are defined by selecting the predefined shaded area sector characters $31_n$ from each font, respectively contained in the tables identified as $24a_1$–$24a_4$. In this example, area region #5 has a white background, and thus no shaded area sector characters $31_n$ are utilized to define this area region of the chart. However, area region #5 could have also been shaded by selecting shaded area sector characters $31_n$ of a font having area sector characters $31_n$ of the desired shading density or shading style. If the graphic representation is to have all shaded area regions of the same shading density or shading style, but with different colors, like shaded area sector characters $31_n$ of a single font may be printed in selected colors to define each shaded area region. Similarly, area regions having different shading densities or shading styles can be printed in different colors if desired. This is explained in more detail below.

Figure 6:
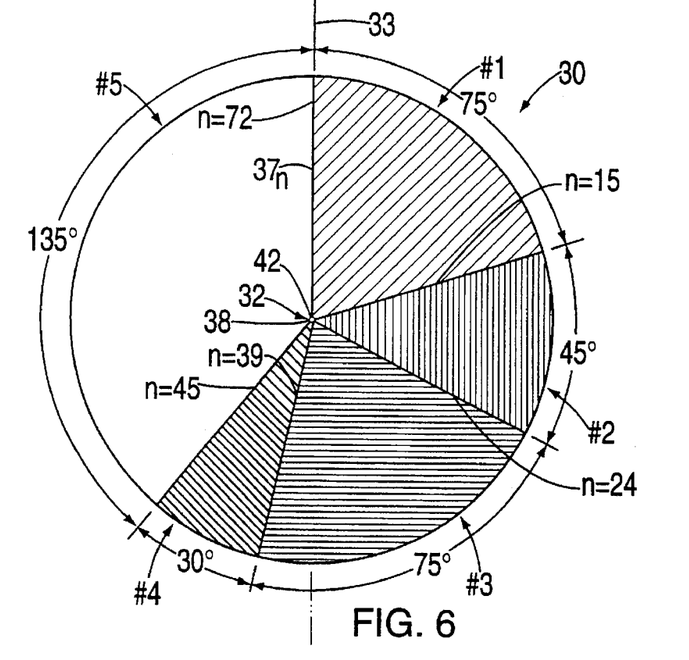
FIG. 6 is a depiction of the completed chart with boundaries between the area regions thereof.

Referring again to the chart 30 of FIG. 6, a phantom radial line 33 extends through the common vertex 32 and forms a datum as shown. Although depicted as a vertically oriented line in the drawings, the phantom radial line 33 may form a datum for the representation from any angular orientation. As depicted in the example, area region #1 represents an arc of 75°, area region #2 represents an arc of 45°, area region #3 represents an arc of 75°, area region #4 represents an arc of 30°, and area region #5 represents an arc of 135°. For most applications, it is not really necessary for the actual areal percentage of each area region to exactly match the percentages for each quantity to be represented, as the actual proportions of the individual areas are usually stated in written percentages on or near the graphic representation.

With particular reference to FIGS. 3 and 8–13, a font set 28 is generally comprised of fonts of a particular point size. In this example, the font set 28 includes a plurality of shaded area sector fonts of a first font type, identified in the ASCII character code font tables $24a_1$–$24a_x$, an arc segment font (second font type) identified in font table 24b, and a radial line segment font (third font type) identified in font table 24c. For the purpose of description, each of font tables $24a_1$–$24a_x$ contains a set of predefined shaded area sector characters $31_n$ of like shading style or shading density (i.e., attributes). Each area sector character $31_n$ is defined by a first phantom radial $34_n$ of a predetermined length and a second phantom radial $36_n$ of the same length joined at a vertex 38 and diverging at an angle 360/n therebetween, and a phantom arc segment $40_n$ joining the first and second phantom radials $34_n$, $36_n$ opposite the vertex 38. To generate the chart, all characters $31_n$ that are used to define each shaded area region are printed with the vertex 38 thereof at the common origin 32 of the chart. Font table 24b contains a plurality of predefined arc segment characters $35_n$, where each arc segment character $35_n$ has a predefined angular position around the common origin 32 relative to the phantom datum line 33 and is located a radial distance from the common origin 32 substantially equal to the length of the phantom radials 34n, $36_n$ for the shaded sector characters $31_n$ in the font set 28. The arc segment characters $35_n$ may be selected to generate a hard border around a shaded or non-shaded area region of the chart. Font table 24c contains a multiplicity of predefined radial line segment characters $37_n$. Each radial line segment character $37_n$ is of a length substantially equal to the length of the phantom radials substantially equal to the length of the phantom radials $34_n$, $36_n$ and includes a first end 42 and a second end 44. The radial line segment characters $37_n$ may be selected to form hard borders between adjacent area regions having different shading styles or shading densities, or between shaded and non-shaded area regions in accordance with the desired chart configuration. The same sets of arc segment characters 35n and radial line segment characters $37_n$ can be used with a variety of differently shaded area sector characters $31_n$. The exemplary chart 30 is constructed with hard borders between adjacent area regions and around the periphery of the chart. However, in alternative chart configurations, it may not be necessary to utilize arc segment characters $35_n$ and radial line segment characters $37_n$ to define hard borders. These embodiments are described in more detail below.

Figure 4:
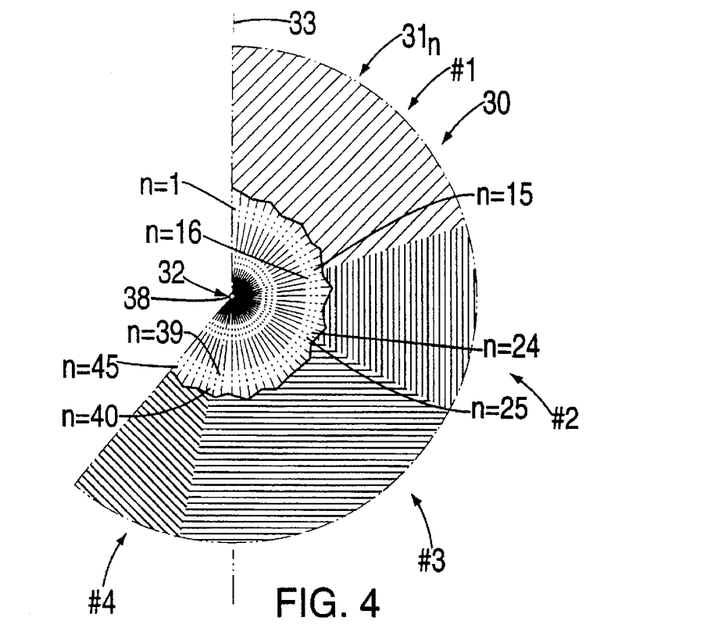
FIG. 4 is a depiction of the area regions of a sample chart generated in accordance with the present invention.

As shown in FIGS. 8–13, each font has 360/n characters, where the choice of n is arbitrary. In the exemplary embodiment, n=72 and the resulting arc of each character equates to an angular displacement of 5°. As shown in FIG. 4, area region #1 (75°) of the chart 30 is comprised of fifteen (15) shaded area sector characters $31_n$, where n=1 to n=15. Referring to table $24a_1$, the corresponding ASCII character codes are from x'21 to x'2F. Note that the sample font tables have a space at character code x'20, such that the first text character is identified by character code x'21. In the chart 30, the area region #2 is constructed with the font of table $24a_2$, with nine (9) shaded area sector characters $31_n$, where n=16 to n=24. The corresonding ASCII character codes are x'30 to x'38. The area region #3 is generated with the font of table $24a_3$, with fifteen (15) shaded area sector characters $31_n$, where n=25 to n=39. The corresponding ASCII character codes are x'39 to x'47. The area region #4 is generated with the font of table $24a_4$, with six (6) shaded area sector characters $31_n$, where n=40 to n=45. The corresponding ASCII character codes are x'48 to x'4C. The remaining area region #5 is not shaded and thus defined by the borders with adjacent shaded area regions #1 and #4, and the outer hard border described below (see FIG. 5). This region can be represented in a different shading density or shading style, in which case additional shaded area sector characters $31_n$, where n=46 to n=72, can be selected in the appropriate font of the first font type.

Figures 5, 5A:
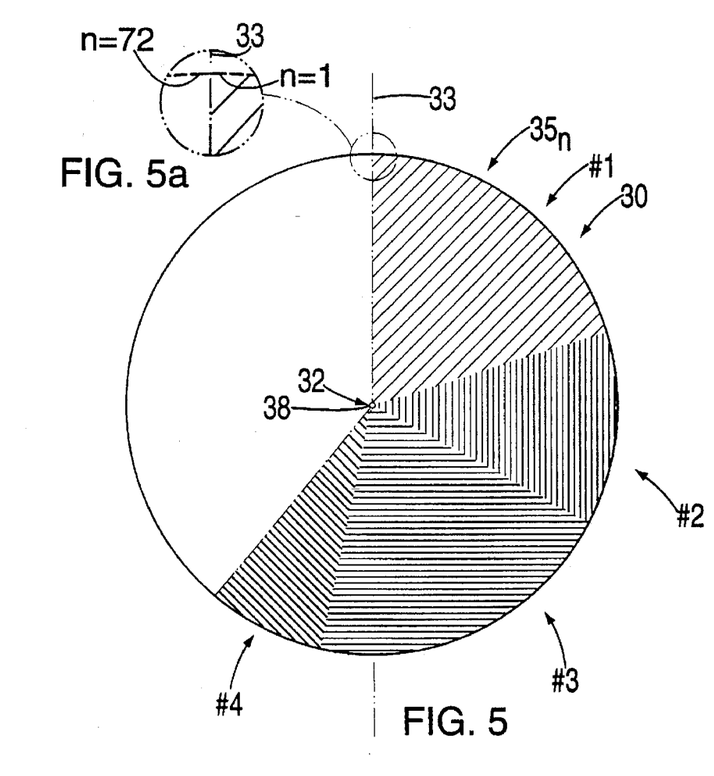
FIG. 5 is a depiction of the area regions and a border for the chart.
FIG. 5a is an enlarged detail view depicting the arrangement of some of the constituent characters that define the hard border shown in FIG. 5.

As shown in FIG. 5, the chart 30 is generated with a plurality of arc segment characters 35n from the font in table 24b (FIG. 12), where n=1 to n=72. The corresponding ASCII character codes are x'21 to x'68. As discussed above, each arc segment character 35n is displaced from the common origin 32 a distance substantially equal to the length of the phantom radials $34_n$, $36_n$. Although the chart 30 of FIG. 6 contains a hard border around the entire periphery thereof, an alternative chart configuration could be defined solely by the shaded area sector characters $31_n$ that make up shaded area regions #1–#4, and a number of arc segment characters $35_n$ that are positioned around the non-shaded area region #5. In that configuration, a hard border would be defined by arc segment characters $35_n$ at n=46 to n=72, with the remaining periphery of the chart being defined by the edge of the shaded area sector characters $31_n$ along the respective phantom arc segments $40_n$ thereof.

To segregate adjacent area regions of different shading density or shading style, hard borders may optionally be formed therebetween by selecting radial line segment characters $37_n$ from the radial line segment font of table 24c (FIG. 13), that are disposed in the same predefined angular positions as the phantom radials of arc sector characters $31_n$ located at the edges of each area region of different shading density or shading style. In the illustrative chart, radial line segment characters are disposed at n=15, n=24, n=39, n=45 and n=72, corresponding to locations 75°, 120°, 195°, 225° and 360° from the phantom datum line 33, and are arranged with the first ends 42 thereof extending from the common origin 32 as shown in FIG. 6. The corresponding character codes identifying such radial line segment characters in table 24c are x'2F, x'38, x'47, x'4D and x'68.

Thus, in accordance with the foregoing, the computer 12 executes an application and represents a sample chart 30 having five (5) area regions, where four (4) area regions are of a different shading density or shading style, and one (1) area region is non-shaded. A hard border is defined between each shaded area region and the non-shaded area region and the shaded area regions adjacent to the non-shaded area region, and a hard border is defined around the entire periphery of the chart. A method of printing this chart 30 in accordance with the invention may be implemented as follows:

(a) the processor 20 selects predefined shaded area sector characters $31_n$ from the font set 28 in the data memory 18, specifically, shaded area sector characters n=1 to n=15 from font table $24a_1$ to form area region #1 , shaded area sector characters n=16 to n=24 from font table $24a_2$ to form area region #2, shaded area sector characters n=25 to n=39 from font table $24a_3$ to form area region #3, and shaded area sector characters n=40 to n=45 from font table $24a_4$ to form area region #4 (see FIG. 4);

(b) the processor 20 selects arc segment characters $35_n$ from font table 24b in the data memory 18, specifically arc segment characters $35_n$ at n=1 to n=72 (see FIG. 5); and (c) the processor 20 selects radial line segment characters $37_n$ from font table 24c in the data memory 18, specifically those radial line segment characters at n=15, n=24, n=39, n=45 and n=72; (see FIG. 6); and (d) thereafter, the processor 20 enables the print mechanism 22 to print the chart 30 with each of the selected predefined shaded area sector characters $31_n$ with its vertex 38 at the common origin 32 and in its predefined angular position relative to the phantom datum line 33, each of the selected predefined arc segment characters $35_n$ in its corresponding angular position around the common origin 32 relative to the phantom datum line 33, and each of the selected predefined radial line segment characters $37_n$ with one end thereof extending from the common origin 32, at its corresponding angular position relative to the phantom datum line 33.

If the printer 14 has color printing capability, some or all of the shaded area regions of the chart can be printed in different colors, by enabling the print mechanism 22 to print each character in the desired color in accordance with conventional printing techniques.

In a modification of the above embodiment, such a chart 30 can be represented using fewer characters if desired. The hard borders between adjacent shaded area regions are optional, as the different shading style or shading density of each area region will render a visible border between shaded area regions. Similarly, the hard border defined by arc segment characters $35_n$, where n=1 to n=45 can be omitted. In such a chart, the only arc segment characters $35_n$ required are those at n=46 to n=72 in order to define a hard border around the non-shaded area region #5. In yet another implementation, another font type comprising a single circle border character can be used to form a continuous hard border around the shaded and non-shaded area regions of the chart. The circle border character has a center disposed at the common origin and a radius substantially equal to the length of the shaded area sector characters of the first font type.

In another modification of the above embodiment, such a chart 30 may be represented using a single shaded area sector font, but where each shaded area region is defined by printing the characters $31_n$ of that font in a different color. Thus, shaded area sector characters $31_n$ of the same shading density or shading style can be used to define multiple area regions. The method would be implemented by selecting the necessary number of shaded area sector characters $31_n$ from any font of the first font type, and printing groups of shaded area sector characters $31_n$ from the single font in the appropriate colors. Thus, assuming the same number and configuration of shaded area regions as in the sample chart 30, shaded area region #1 can be represented by printing shaded area sector characters $31_n$ from n=1 to n=15 in a first color, shaded area region #2 can be represented by printing shaded area sector characters $31_n$ from n=16 to n=24 in a second color, shaded area region #3 can be represented by printing shaded area sector characters $31_n$ from n=25 to n=39 in a third color, and shaded area region #4 can be represented by printing shaded area sector characters $31_n$ from n=40 to n=45 in a fourth color. Similarly, if a hard border is to be defined around the outer periphery of the chart 30, each of the arc segment characters $35_n$ that form the hard border for a respective shaded area region can be printed in the same color as the shaded area sector characters of that shaded area region. Thus, the arc segment characters $35_n$ from n=1 to n=15 can be printed in the first color, those from n=16 to n=24 in the second color, those from n=25 to n=39 in the third color, and those from n=40 to n=45 in the fourth color. The arc segment characters from n=46 to n=72 that form a hard border for the non-shaded area region #5 may be printed in any of the foregoing colors or a different color. Furthermore, if hard borders are to be defined between the shaded area regions and at the interface between those shaded area regions that border the non-shaded area region, radial line segment characters $37_n$ can be printed in the same color as either of the adjacent shaded area regions or a different color as desired.

Figure 14:
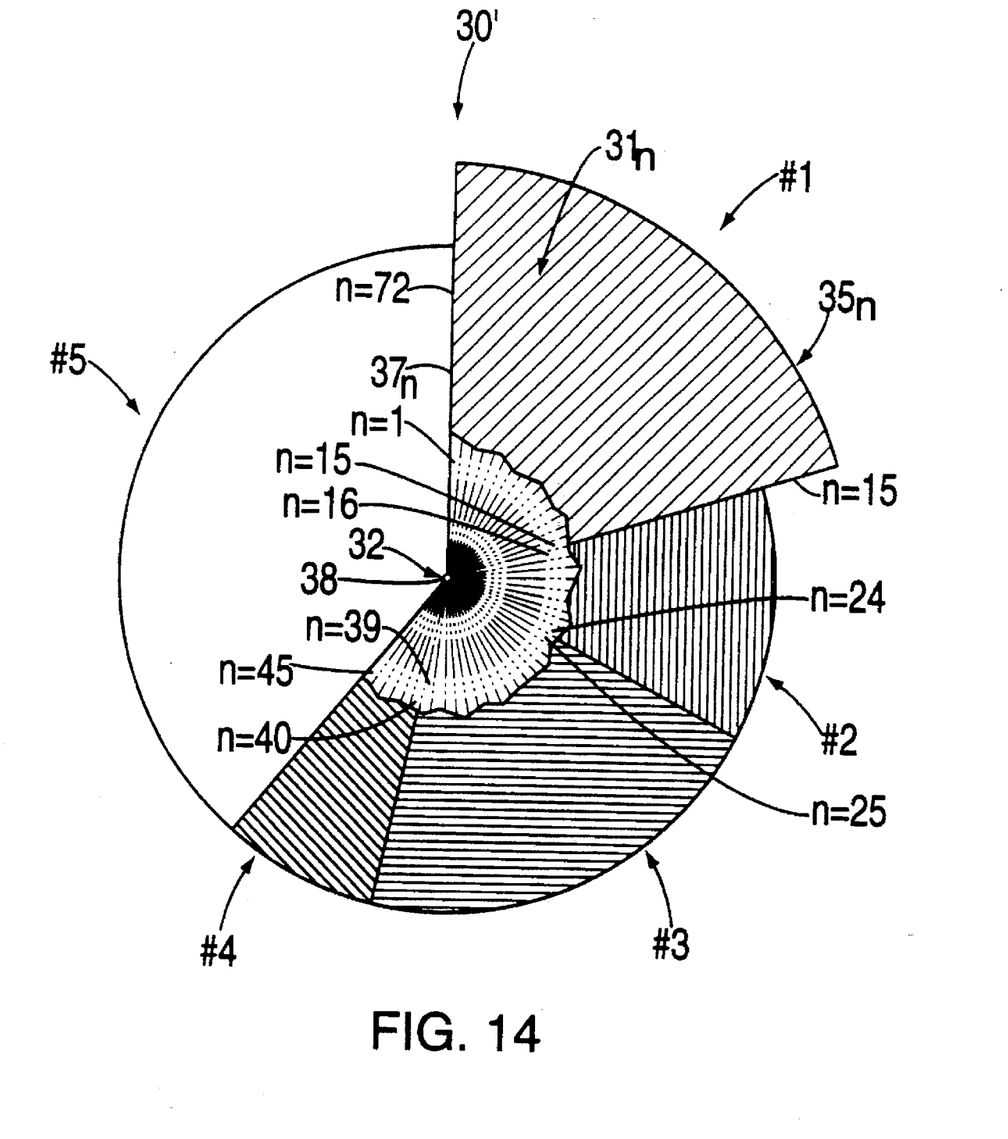
FIG. 14 is a depiction of another exemplary chart generated in accordance with the present invention.

In any of the above-described embodiments, the same chart 30 can be represented in different sizes by selecting fonts from the font set of the appropriate point size. It is also anticipated that a single-area region of a graph can be emphasized by, for example, increasing its size as shown in FIG. 14. In this example, a chart 30' is represented as described above and illustrated in FIGS. 4–6, but where shaded area region #1 is larger than the remaining shaded area regions #2–#4 and the non-shaded area region #5. Area region #1 is represented by shaded area sector characters $31_n$ and bounded by arc segment characters $35_n$ and radial line segment characters $37_n$ selected from a font set 28 of a different point size than of the characters representing the rest of the graph. Thus, shaded area sector characters $31_n$ from n=1 to n=15 are selected from a first font type of a larger point size. Similarly, the hard border defined by arc segment characters $35_n$ from n=1 to n=15 are selected from a second font type of a larger point size. In the same manner, the radial line segment characters $37_n$ at n=15 and n=72 are selected from a third font type of a larger point size.

Figure 7:
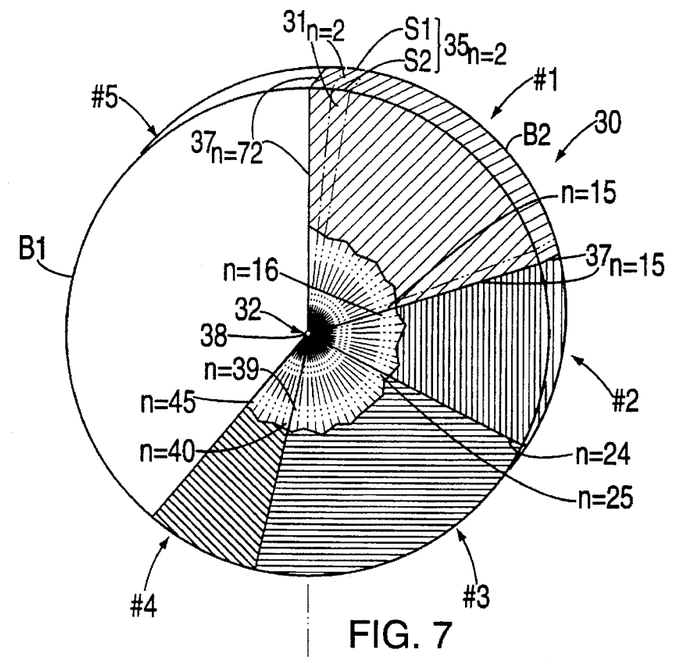
FIG. 7 is a depiction of another exemplary chart generated in accordance with the present invention.
Figure 8:
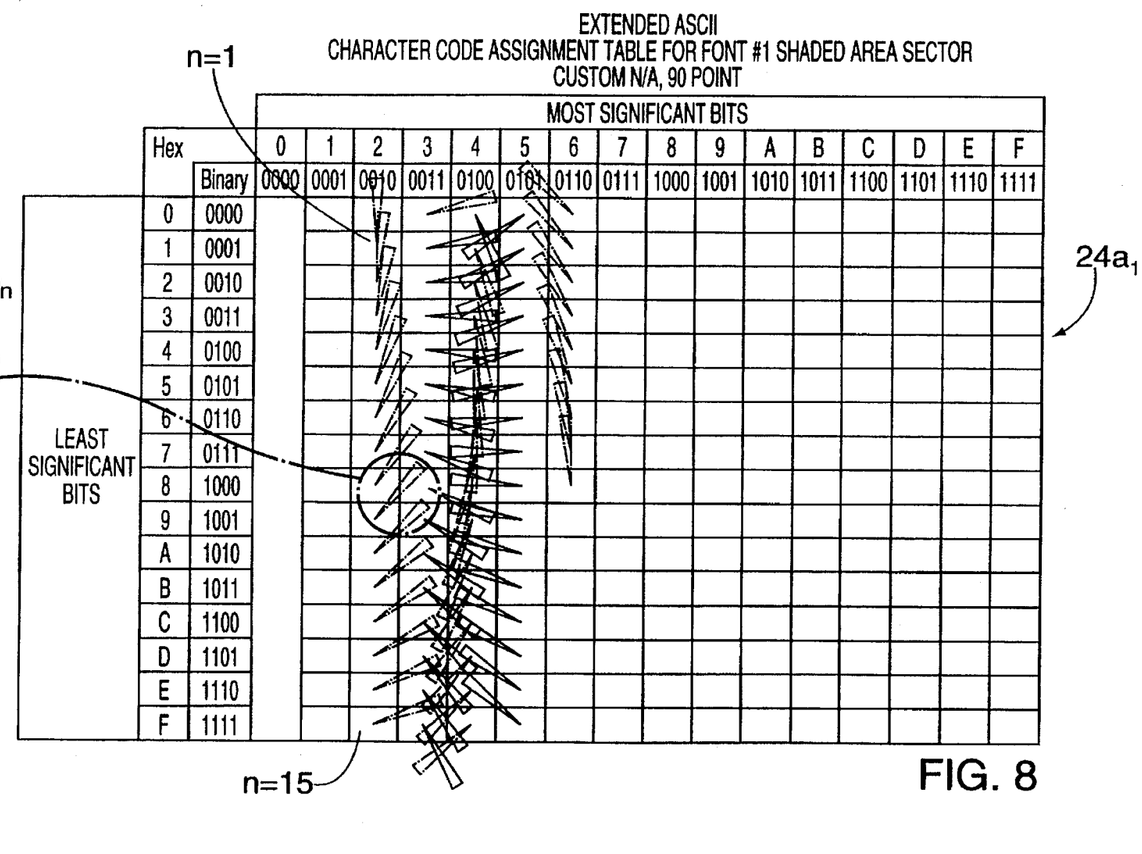
FIG. 8 is a sample font table for a font set or type.
Figure 8A:
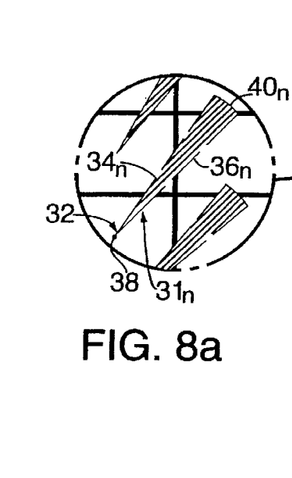
FIG. 8a is an enlarged detail view of some of the characters in the font table of FIG. 8.
Figure 9:
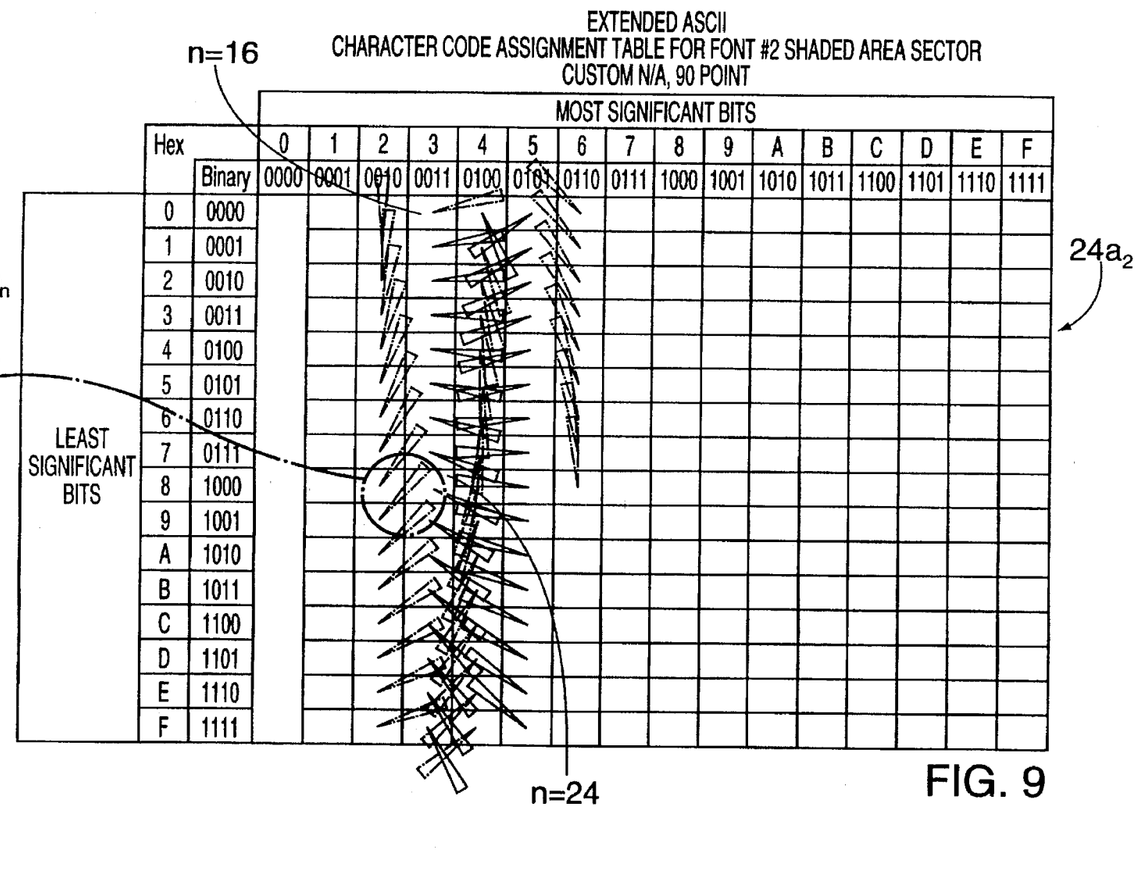
FIG. 9 is a sample font table for a font set or type.
Figure 9A:
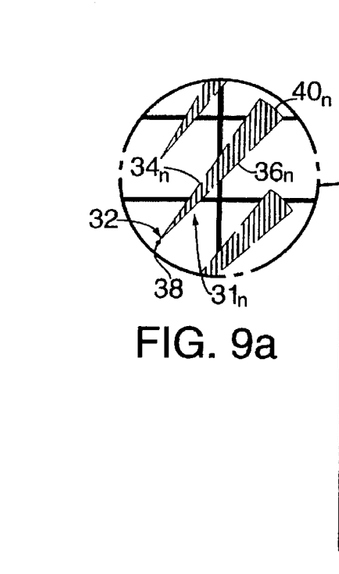
FIG. 9a is an enlarged detail view of some of the characters in the font table of FIG. 9.
Figures 10, 10A:
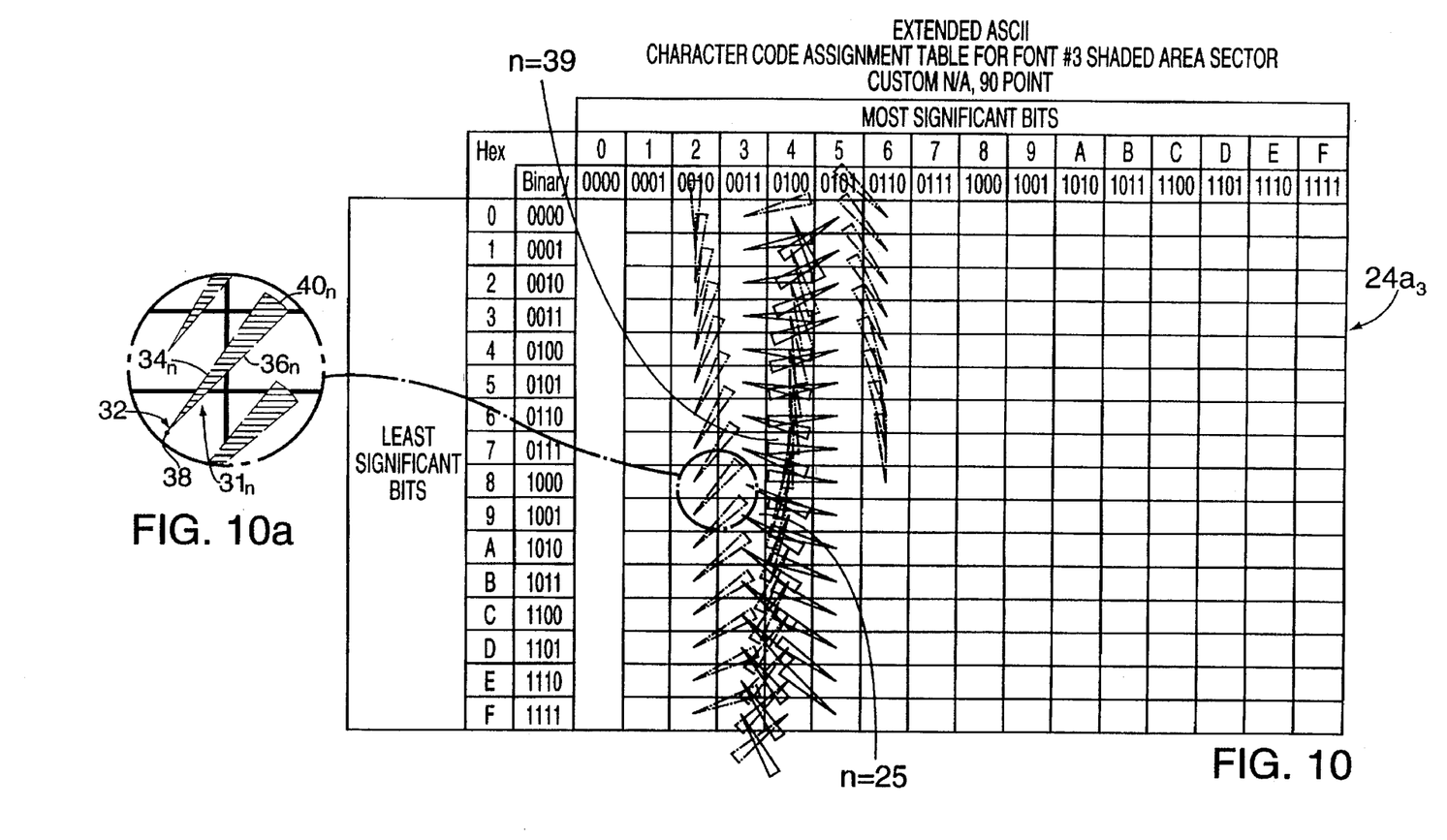
FIG. 10 is a sample font table for a font set or type.
FIG. 10a is an enlarged detail view of some of the characters in the font table of FIG. 10.
Figure 11:
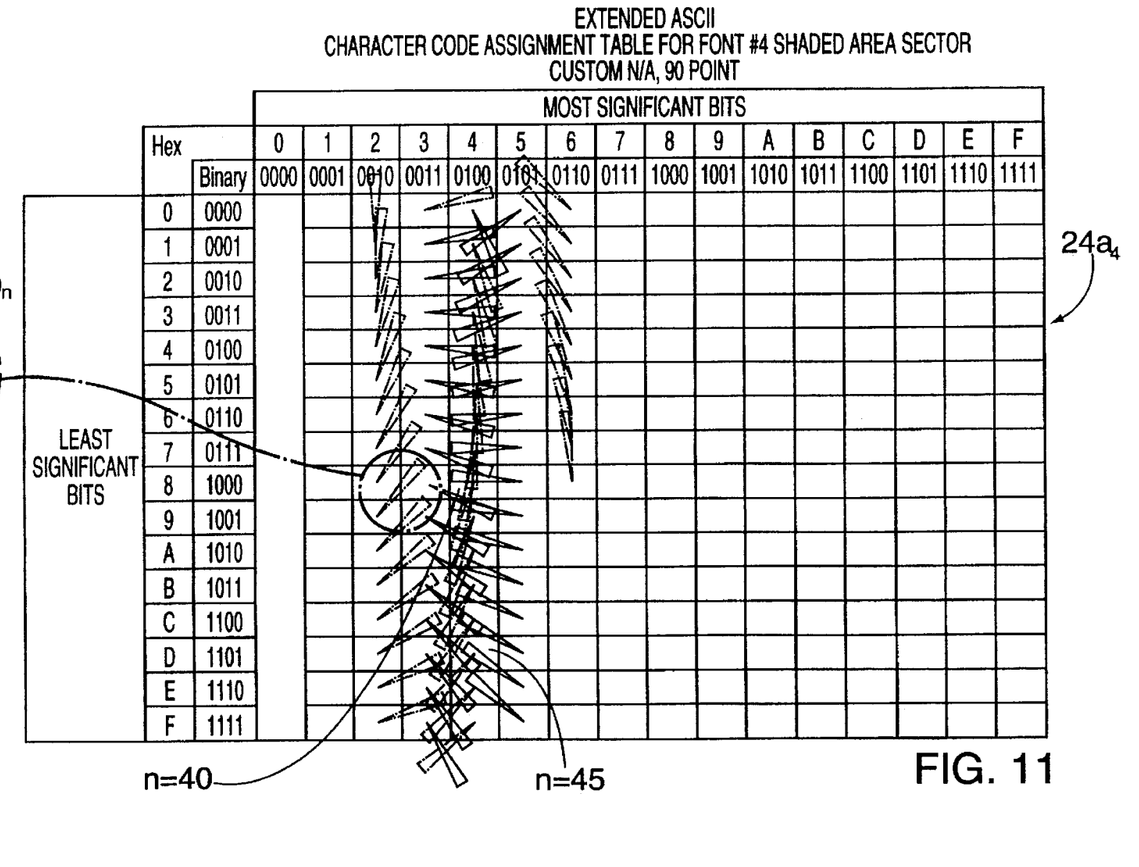
FIG. 11 is a sample font table for a font set or type.
Figure 11A:
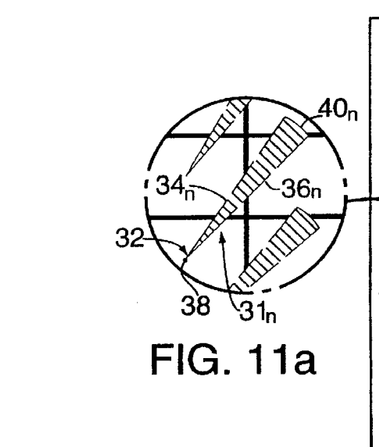
FIG. 11a is an enlarged detail view of some of the characters in the font table of FIG. 11.
Figures 12, 12A:
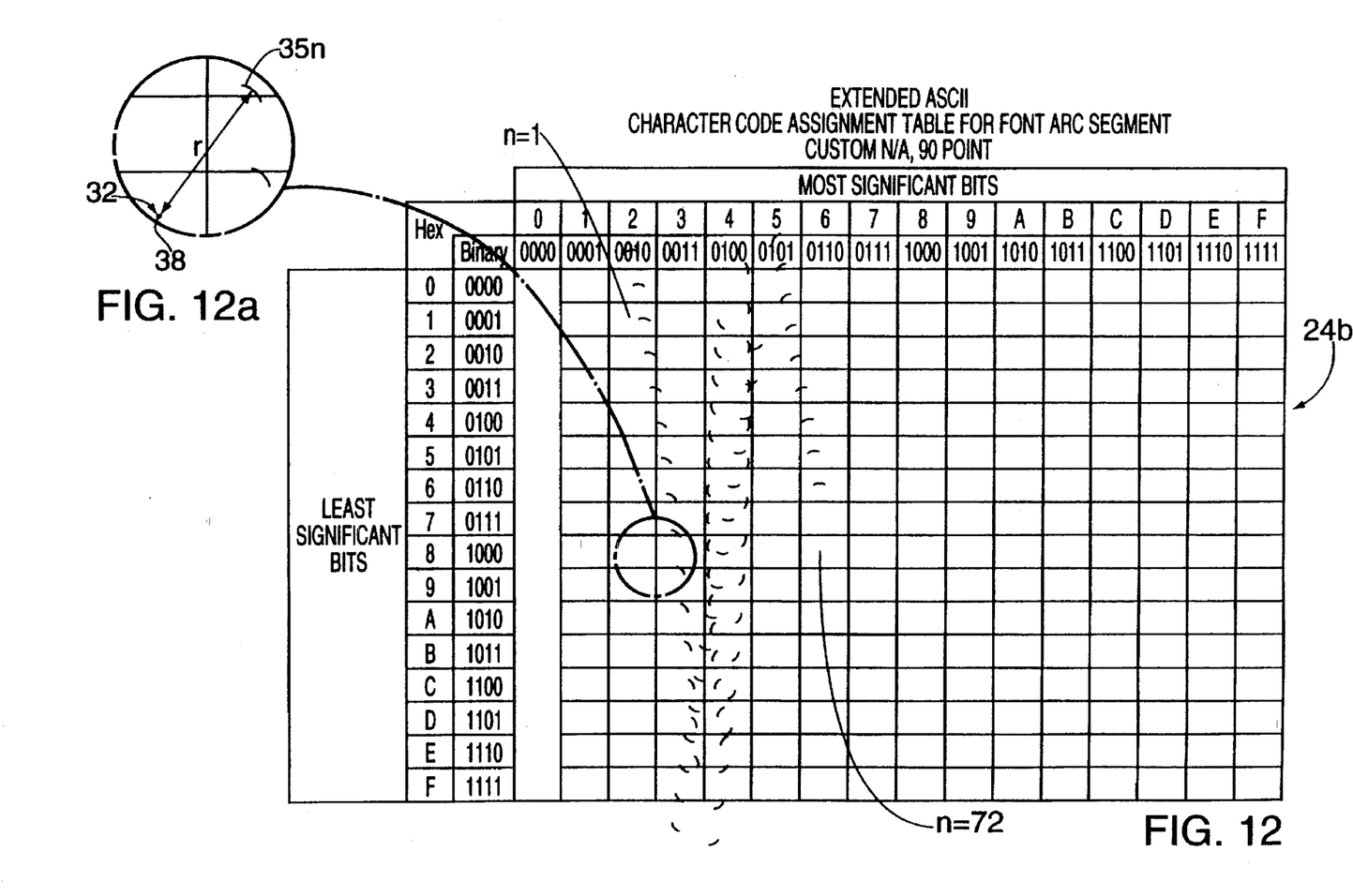
FIG. 12 is a sample font table for a font set or type.
FIG. 12a is an enlarged detail view of some of the characters in the font table of FIG. 12.
Figures 13, 13A:
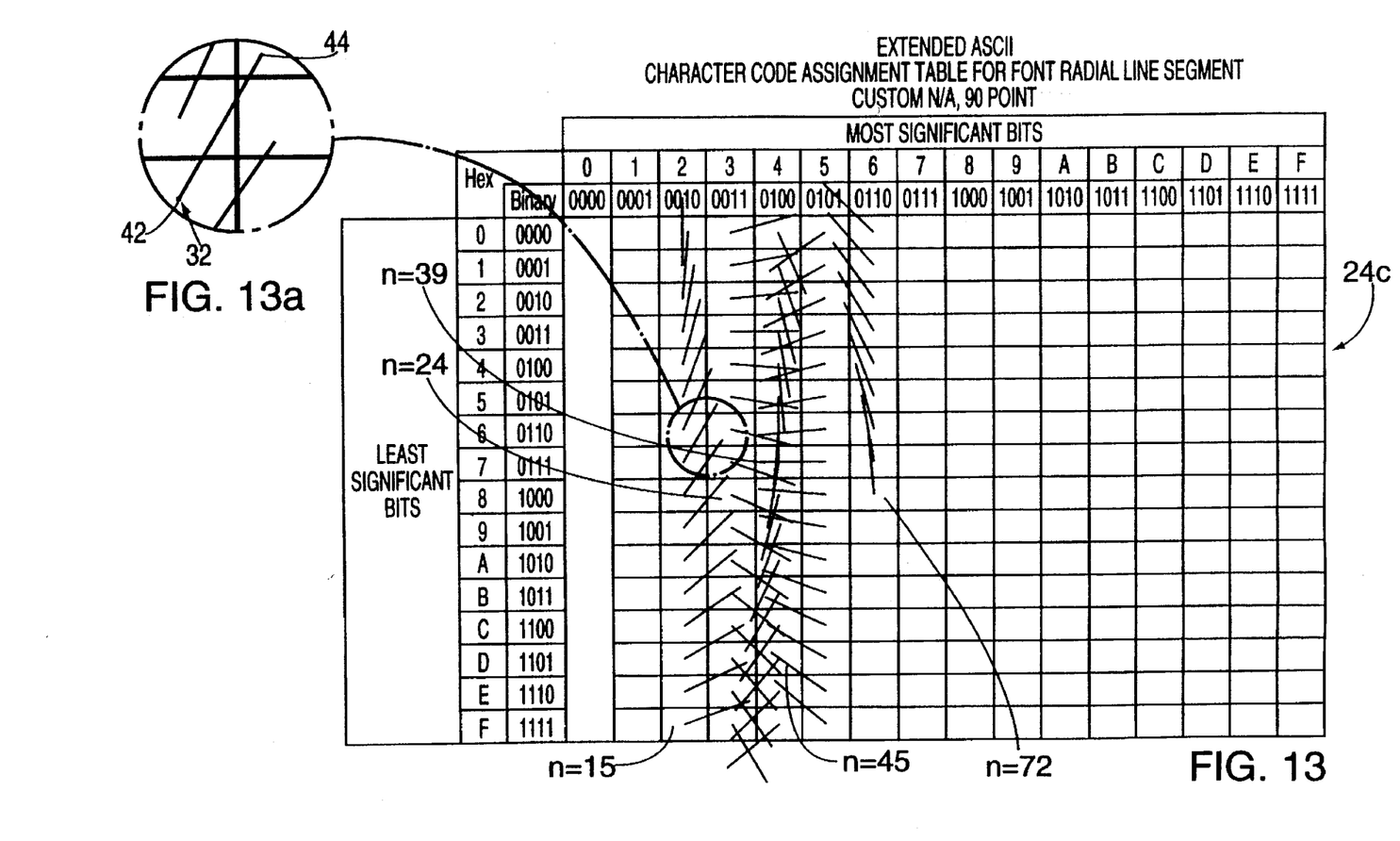
FIG. 13 is a sample font table for a font set or type.
FIG. 13a is an enlarged detail view of some of the characters in the font table of FIG. 13.

Although the foregoing describes a method for representing a circular pie-chart in a plan view, it is anticipated that the same method can be applied to graphic representations having other configurations. For example, the chart may be represented in an isometric, perspective or like view as shown in FIG. 7. In such an embodiment, the characters that form the respective shaded area regions, arc segment borders and radial line segments are modified to provide the desired visual presentation. Thus, for example, a shaded area sector character $31_n$ at n=2 has a portion which extends away from the forward plane of the chart. Similarly, the arc segment character $35_n$ at n=2 is comprised of a first segment S1 that resides in the forward plane and a second segment S2 that is displaced rearwardly of the forward plane and positioned relative to the area segment character $31_n$ at n=2 as shown. In this connection, the radial line segments $37_n$ at n=15 and $37_n$ at n=72 are configured with a break and change of angle at the forward plane boundary B1 as shown. The resultant chart has a generally elliptical primary boundary B1 and a generally elliptical secondary boundary B2.

In accordance with this method, other configurations may be represented by arranging the constituent characters in each table in a particular geometric relationship relative to each other and the common origin 32. Any graphic representation having a common origin may be rendered using text characters in accordance with the teachings of the present invention.

The present invention has been shown and described in what are considered to be the most practical and preferred exemplary embodiments. It is anticipated, however, that departures may be made therefrom and that obvious modifications will be implemented by persons skilled in the art.

I claim:

1. A method of printing graphic data on a print system having associated data memory, at least one processor and a printer mechanism, using at least two fonts, said at least two fonts comprised of n predefined text characters stored in said data memory to generate a chart having a common origin and at least two shaded area regions having different attributes, each text character of each of said fonts comprising a shaded area sector having a unique predefined angular position around said common origin relative to a phantom datum line passing through said common origin, said shaded area sector having a border defined by a first phantom radial of a predetermined length and a second phantom radial of said predetermined length joined at a vertex and diverging at an angle 360/n therebetween, and a phantom arc segment joining said first and second phantom radials opposite said vertex, said chart being represented in character data, the method comprising the steps of:

(a) said processor selecting at least one predefined shaded area sector character from a first of said at least two fonts in accordance with said character data to define a first of said at least two shaded area regions;

(b) said processor selecting at least one predefined shaded area sector character from a second of said at least two fonts in accordance with said character data to define a second of said at least two shaded area regions; and (c) said processor enabling said printer mechanism to print said selected predefined shaded area sector characters, with said vertex of each of said predefined shaded area sector characters at said common origin and each of said predefined shaded area sector characters in said predefined angular position for each of said predefined shaded area sector characters around said common origin relative to said phantom datum line.

2. The method recited in claim 1, wherein said data memory further includes a font comprising a plurality of predefined arc segment characters, each arc segment character having a unique predefined angular position around said common origin relative to said phantom datum line, and being located a radial distance from said origin substantially equal to said length of said phantom radials, where said method further comprises the step of said processor selecting at least one predefined arc segment character to define a hard border substantially coincident with a radial location of at least one phantom arc segment around said at least one of said shaded area regions of said chart in any order relative to steps (a) and (b), and prior to implementing step (c), where step (c)further comprises said processor enabling said print mechanism to print said selected at least one predefined arc segment character in said predefined angular position for said at least one predefined arc segment character around said common origin relative to said phantom datum line.

3. The method recited in claim 2, wherein said data memory further includes a font comprising a plurality of predefined radial line segment characters, each radial line segment character extending from said common origin and having a unique predefined angular position relative to said phantom datum line, and being of a predetermined length substantially equal to said length of said phantom radials, and wherein said method further comprises the step of said processor selecting at least one predefined radial line segment character to define a hard border substantially coincident with at least one of said phantom radials between said at least two shaded area regions in any order relative to steps (a) and (b) and prior to step (c), where step (c) further comprises said processor enabling said print mechanism to print said selected at least one predefined radial line segment character extending from said common origin in said predefined angular position for said at least one predefined radial line segment character relative to said phantom datum line.

4. The method recited in claim 1, wherein said at least two shaded area regions are printed in different colors, said processor enabling said print mechanism to print said at least one shaded area sector character defining a first of said shaded area regions in a first color and said at least one shaded area sector character defining a second of said shaded area regions in a second color.

5. The method recited in claim 2, wherein said at least two shaded area regions are printed in different colors, said processor enabling said print mechanism to print said at least one shaded area sector character defining a first of said shaded area regions in a first color and said at least one shaded area sector character defining a second of said shaded area regions in a second color, and said processor enabling said print mechanism to print at least one arc segment character around said first shaded area region in said first color, and at least one arc segment character around said second shaded area region in said second color.

6. The method recited in claim 3, wherein said at least two shaded area regions are printed in different colors, said processor enabling said print mechanism to print said at least one shaded area sector character defining a first of said shaded area regions in a first color and said at least one shaded area sector character defining a second of said shaded area regions in a second color, said processor further enabling said print mechanism to print at least one arc segment character around said first shaded area region in said first color, and at least one arc segment character around said second shaded area region in said second color, said processor further enabling said print mechanism to print said at least one radial line segment character in one of said colors.

7. A method of printing graphic data on a print system having associated data memory, at least one processor and a printer mechanism, using a plurality of fonts comprised of n predefined text characters stored in said data memory to generate a chart having a common origin, at least one shaded area region, and at least one non-shaded area region, each text character of a first font comprising a shaded area sector having a unique predefined angular position around said common origin relative to a phantom datum line passing through said common origin, said shaded area sector having a border defined by a first phantom radial of a predetermined length and a second phantom radial of said predetermined length joined at a vertex and diverging at an angle 360/n therebetween, and a phantom arc segment joining said first and second phantom radials opposite said vertex, each text character of a second font comprising an arc segment having a unique predefined angular position around said common origin relative to said phantom datum line, said arc segment located a radial distance from the origin substantially equal to said length of said phantom radials, said chart being represented in character data, the method comprising the steps of, with steps (a) and (b) in any order, but prior to implementing step (c):

(a) said processor selecting from said data memory at least one predefined shaded area sector character from said first font in accordance with said character data to define at least one shaded area region;

(b) said processor selecting from said data memory at least one predefined arc segment character from said second font in accordance with said character data to define a border for at least one non-shaded area region; and (c) said processor enabling said printer mechanism to print said selected at least one predefined shaded area sector character with said vertex of said at least one predefined shaded area sector character at said common origin and said at least one predefined shaded area sector character in said predefined angular position for said at least one predetermined shaded area sector character around said common origin relative to said phantom datum line, said processor further enabling said print mechanism to print said selected at least one predefined arc segment character in said predefined angular position for said at least one predefined arc segment character around said common origin relative to said phantom datum line.

8. The method recited in claim 7, wherein said data memory further includes a font comprising a plurality of predefined radial line segment characters, each radial line segment character extending from said common origin and having a unique angular position relative to said phantom datum line, and being of a predetermined length substantially equal to said length of said phantom radials, and wherein said method further comprises the step of said processor selecting at least one predefined radial line segment character to define a hard border substantially coincident with at least one phantom radial between said at least one shaded area region and said non-shaded area region in any order relative to steps (a) and (b) and prior to step (c), where step (c)further comprises said processor enabling said print mechanism to print said selected at least one predefined radial line segment character extending from said common origin in said predefined angular position for said at least one predefined radial line segment character relative to said phantom datum line.

9. The method recited in claim 7, wherein at least two shaded area regions are printed in different colors, said processor enabling said print mechanism to print said at least one shaded area sector character defining a first of said shaded area regions in a first color and said at least one shaded area sector character defining a second of said shaded area regions in a second color.

10. The method recited in claim 7, wherein at least two shaded area regions are printed in different colors, said processor enabling said print mechanism to print said at least one shaded area sector character defining a first of said shaded area regions in a first color and said at least one shaded area sector character defining a second of said shaded area regions in a second color, and said processor enabling said print mechanism to print at least one arc segment character around said first shaded area region in said first color, and at least one arc segment character around said second shaded area region in said second color.

11. The method recited in claim 8, wherein said at least two shaded area regions are printed in different colors, said processor enabling said print mechanism to print said at least one shaded area sector character defining a first of said shaded area regions in a first color and said at least one shaded area sector character defining a second of said shaded area regions in a second color, said processor further enabling said print mechanism to print at least one arc segment character around said first shaded area region in said first color, and at least one arc segment character around said second shaded area region in said second color, said processor further enabling said print mechanism to print said at least one radial line segment character in one of said colors.

12. A method of printing graphic data on a print system having associated data memory, at least one processor and a printer mechanism, using at least one font comprised of n predefined text characters stored in said data memory to generate a chart having a common origin and at least two shaded area regions of a different color, each text character of said font comprising a shaded area sector having a unique predefined angular position around said common origin relative to a phantom datum line passing through said common origin, said shaded area sector having a border defined by a first phantom radial of a predetermined length and a second phantom radial of said predetermined length joined at a vertex and diverging at an angle 360/n therebetween, and a phantom arc segment joining said first and second phantom radials opposite said vertex, said chart being represented in character data, the method comprising the steps of:

(a) said processor selecting a plurality of predefined shaded area sector characters from said font in accordance with said character data to define a first shaded area region and a second shaded area region; and (b) said processor enabling said print mechanism to print at least one of said selected predefined shaded area sector characters in a first color with said vertex of said at least one area predefined shaded sector character in said first color at said common origin and said at least one predefined shaded area sector character in said first color in said predefined angular position for said at least one predefined shaded area sector character in said first color around said common origin relative to said phantom datum line to define a first shaded area region in said first color, said processor further enabling said print mechanism to print at least one of said selected predefined shaded area sector characters in a second color with said vertex of said at least one predefined shaded area sector character in said second color at said common origin and said at least one predefined shaded area sector character in said second color in said predefined angular position for said at least one predefined shaded area sector character in said second color around said common origin relative to said phantom datum line to define a second shaded area region in said second color.

* * * * *